(12) United States Patent
Kim

(10) Patent No.: US 6,947,821 B2
(45) Date of Patent: Sep. 20, 2005

(54) SYSTEM AND METHOD FOR CONTROLLING AN AUTOMATIC TRANSMISSION

(75) Inventor: Hoe Gab Kim, Ansan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/998,520

(22) Filed: Nov. 29, 2004

(65) Prior Publication Data

US 2005/0125129 A1  Jun. 9, 2005

(30) Foreign Application Priority Data

Nov. 27, 2003 (KR) .................... 10-2003-0085161

(51) Int. Cl.[7] ............................................. B60K 41/02
(52) U.S. Cl. .............................. 701/51; 701/55; 701/56
(58) Field of Search ............................. 701/51, 55, 56, 701/67; 477/38, 156, 160

(56) References Cited

U.S. PATENT DOCUMENTS

| | | | |
|---|---|---|---|
| 5,665,020 A | * | 9/1997 | Kamada et al. ............. 475/129 |
| 5,669,849 A | * | 9/1997 | Tabata et al. ............... 477/102 |
| 6,106,434 A | * | 8/2000 | Ibamoto et al. ............. 477/120 |
| 6,190,286 B1 | * | 2/2001 | Ito et al. ..................... 477/160 |
| 6,754,574 B2 | * | 6/2004 | Tokura et al. ................ 701/67 |
| 6,773,372 B2 | * | 8/2004 | Matsubara et al. ........... 477/78 |
| 6,790,160 B2 | * | 9/2004 | Kato et al. .................. 477/154 |
| 6,840,890 B2 | * | 1/2005 | Mack et al. ................. 477/174 |

* cited by examiner

Primary Examiner—Richard M. Camby
(74) Attorney, Agent, or Firm—Morgan Lewis & Bockius LLP

(57) ABSTRACT

Parameter values related to hydraulic pressure characteristics of a solenoid valve in an automatic transmission are stored in a memory associated with a transmission main body. When a transmission control unit for controlling the transmission main body is installed to a vehicle, the transmission control unit retrieves the values from the memory and controls a target current of solenoid valve for realization of a target hydraulic pressure based thereon. The association may be achieved by mounting the memory to the transmission.

17 Claims, 6 Drawing Sheets

SYSTEM AND METHOD FOR CONTROLLING AN AUTOMATIC TRANSMISSION

CROSS-REFERENCE TO RELATED APPLICATIONS

This application claims priority of Korean patent Application No. 10-2003-0085161, filed on Nov. 27, 2003, the disclosure of which is incorporated fully herein by reference.

FIELD OF THE INVENTION

Generally, the present invention relates to an automatic transmission. More particularly, the present invention relates to an automatic transmission control system and method that provides stability in control regardless of tolerance of hydraulic pressure characteristics of solenoid valves used in an automatic transmission.

BACKGROUND OF THE INVENTION

As is well known in the art, an automatic transmission realizes automatic shifting to an appropriate speed according to driving states of a vehicle. For such automatic shifting, an automatic transmission includes at least one friction element therein, and also a hydraulic pressure circuit for hydraulically controlling the friction element.

In order to control hydraulic pressure supplied to the friction element, such a hydraulic pressure circuit includes at least one solenoid valve therein, and an operation of the solenoid valve is controlled by a separate electronic control unit (usually called a transmission control unit). Typically, the transmission control unit controls the solenoid valve by controlling a current supplied to the solenoid valve. In response to the control of the current, the solenoid valve controls hydraulic pressure input thereto.

The hydraulic pressure-current characteristic of the solenoid valves, i.e., the relationship between the current applied to the solenoid valve and hydraulic pressure output from the solenoid valve according to the applied current, always lies within some tolerance range even though the solenoid valves are designed to the same specification. Therefore, if a solenoid valve actually used in the automatic transmission shows a different hydraulic pressure characteristic from a designed specification, the automatic transmission does not provide precise shift quality as designed.

If automatic transmissions are controlled with the same preciseness and stability against the tolerance of solenoid valves, it means an enhancement in the quality of the automatic transmissions. Furthermore, it also means that cheaper and simpler solenoid valves having larger tolerance may be used in an automatic transmission without deteriorating shift quality. Accordingly, it enables a reduction in production cost of an automatic transmission.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

Embodiments of the present invention provide an automatic transmission system, a method for manufacturing an automatic transmission, and a method for controlling an automatic transmission, having non-limiting advantages of consistent precision and stability in control regardless of tolerance of hydraulic pressure characteristics of solenoid valves used in the automatic transmission.

An exemplary method for manufacturing an automatic transmission according to an embodiment of the present invention includes: mounting a sub-memory to a transmission main body, the sub-memory being capable of storing a plurality of data; obtaining a P-I average map corresponding to a predetermined friction element and a solenoid valve for the predetermined friction element; selecting a best-fit virtual map among a plurality of virtual maps, the best-fit virtual map being a virtual map best fitted to the P-I average map; setting parameter values for transformation between the best-fit virtual map and the P-I average map; and storing identification information of the best-fit virtual map and the parameter values in the sub-memory.

In a further embodiment, the sub-memory is fixedly mounted to a valve body of the automatic transmission.

In another further embodiment, the parameters values comprise an offset for defining a translation transformation of the P-I map and a gain for defining a scaling transformation of the P-I map.

An exemplary method for controlling an automatic transmission according to an embodiment of the present invention includes: retrieving parameter values and identification information of a best-fit virtual map stored in a sub-memory mounted to a transmission main body; selecting the best-fit virtual map from a plurality of predetermined virtual maps corresponding the identification information; calculating a target hydraulic pressure for a target friction element of the automatic transmission; calculating a target current of a target solenoid valve for the target hydraulic pressure, on the basis of the virtual map and the parameter values; and applying the target current to the target solenoid valve.

In a further embodiment, the parameter values comprise an offset defining a translation transformation of the P-I map and a gain defining a scaling transformation of the P-I map.

In a still further embodiment, the calculating of the target current calculates the target current as a value of I_target that satisfies "P_target= M_n(I_target×RATIO)× GAIN−OFFSET", wherein M_n denotes the best-fit virtual map, RATIO denotes a current correction rate, and P_target denotes the target hydraulic pressure.

In another further embodiment, an exemplary method for controlling an automatic transmission further includes: measuring an actual current that is actually applied to the target solenoid valve by the applying of the target current to the target solenoid valve; and calculating a current correction value on the basis of the target current and the actual current, wherein the calculating of the target current calculates the target current is further based on the current correction value.

In another further embodiment, an exemplary method for controlling an automatic transmission includes: determining whether communication with the sub-memory is enabled; and setting a predetermined base map as the best-fit virtual map and predetermined base values as the parameter values, wherein the calculating of the target current calculates the target current on the basis of the predetermined base map and the predetermined base values in the case that the communication with the sub-memory is not enabled.

In another further embodiment, the identification information of the best-fit virtual map and the parameter values are stored in the sub-memory according to the exemplary method for manufacturing an automatic transmission according to an embodiment of the present invention.

An exemplary automatic transmission system according to an embodiment of the present invention includes: a transmission main body including at least one friction element, a solenoid valve for controlling hydraulic pressure supplied to the friction element, and a sub-memory storing parameter values and identification information of a best-fit virtual map; and a transmission control unit storing a plurality of predetermined virtual maps and controlling the transmission main body based thereon.

The transmission control unit executes instructions for: retrieving parameter values and identification information of best-fit virtual map stored in a sub-memory mounted to a transmission main body; selecting the best-fit virtual map from a plurality of predetermined virtual maps corresponding the identification information; calculating a target hydraulic pressure for a target friction element of the automatic transmission; calculating a target current of a target solenoid valve for the target hydraulic pressure, on the basis of the virtual map and the parameter values; and applying the target current to the target solenoid valve.

In a further embodiment, the parameters values comprise an offset defining a translation transformation of the P-I map and a gain defining a scaling transformation of the P-I map.

In a still further embodiment, the calculating of the target current calculates the target current as a value of I_target that satisfies "P_target=(I_target×RATIO)× GAIN−OFFSET", wherein M_n denotes the best-fit virtual map, RATIO denotes a current correction rate, and P_target denotes the target hydraulic pressure.

In another further embodiment, the transmission control unit further executes instructions for: measuring an actual current that actually applied to the target solenoid valve after the applying of the target current to the target solenoid valve; and calculating a current correction value on the basis of the target current and the actual current, wherein the calculating of the target current calculates the target current further based on the current correction value.

In another further embodiment, the transmission control unit further executes instructions for: determining whether communication with the sub-memory is enabled; and setting a predetermined base map as the best-fit virtual map and predetermined base values as the parameter values, wherein the calculating of the target current calculates the target current on the basis of the predetermined base map and the predetermined base values in the case that the communication with the sub-memory is not enabled.

In another further embodiment, the identification information of the best-fit virtual map and the parameter values are stored in the sub-memory according to the exemplary method for manufacturing an automatic transmission according to an embodiment of the present invention.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

An embodiment of the present invention will hereinafter be described in detail with reference to the accompanying drawings.

Figure 1:
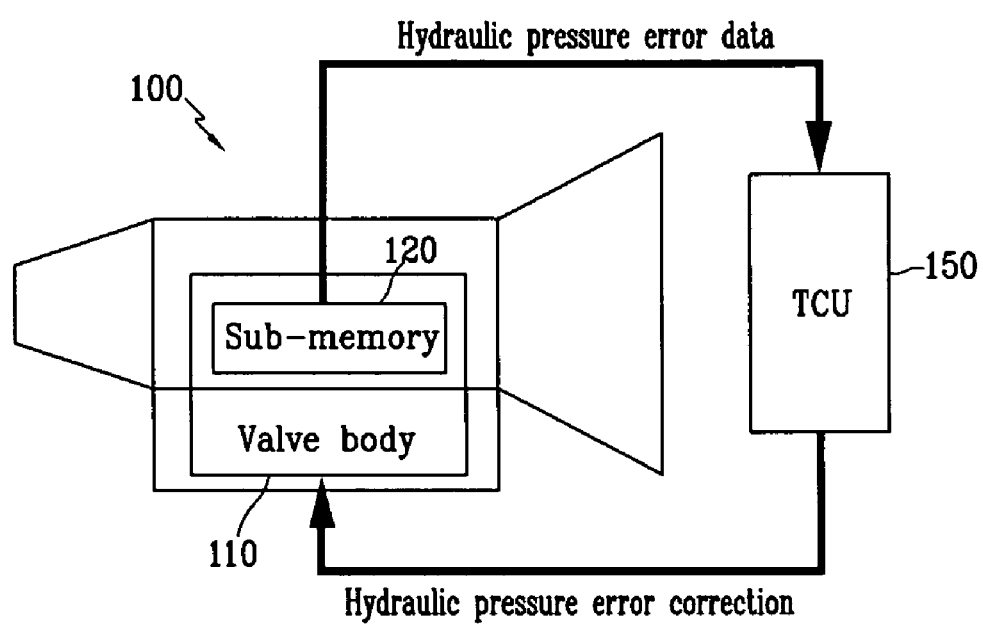
FIG. 1 shows a schematic diagram of an automatic transmission system according to an embodiment of the present invention.

As shown in FIG. 1, an automatic transmission system according to an embodiment of the present invention includes a transmission main body 100 and a transmission control unit (TCU) 150 for controlling the transmission main body 100.

The transmission main body 100 includes at least one friction element (e.g., clutches and brakes) 220 (refer to FIG. 2) for execution of shifting, and at least one solenoid valve 210 (refer to FIG. 2) for controlling hydraulic pressure supplied to the friction element 220. The solenoid valve 210 is disposed in a valve body 110 and may be formed as, e.g., variable force solenoid (VFS).

In addition, as shown in FIG. 1, a sub-memory 120 is provided in the transmission main body 100 (in more detail, in the valve body 110). The sub-memory 120 stores parameter values and identification information of a best-fit virtual map according to a method for manufacturing an automatic transmission according to an embodiment of the present invention. The method for manufacturing an automatic transmission according to an embodiment of the present invention is later described in detail. The sub-memory 120 may be realized as, e.g., an EEPROM (Electrically Erasable Programmable Read Only Memory) or other suitable memory device.

The TCU 150 controls the transmission main body 100 by performing a method for controlling an automatic transmission according to an embodiment of the present invention. The TCU 150 can be realized by one or more processors activated by a predetermined program, and the predetermined program can be programmed to perform each step of a method according to an embodiment of this invention.

Figure 2:
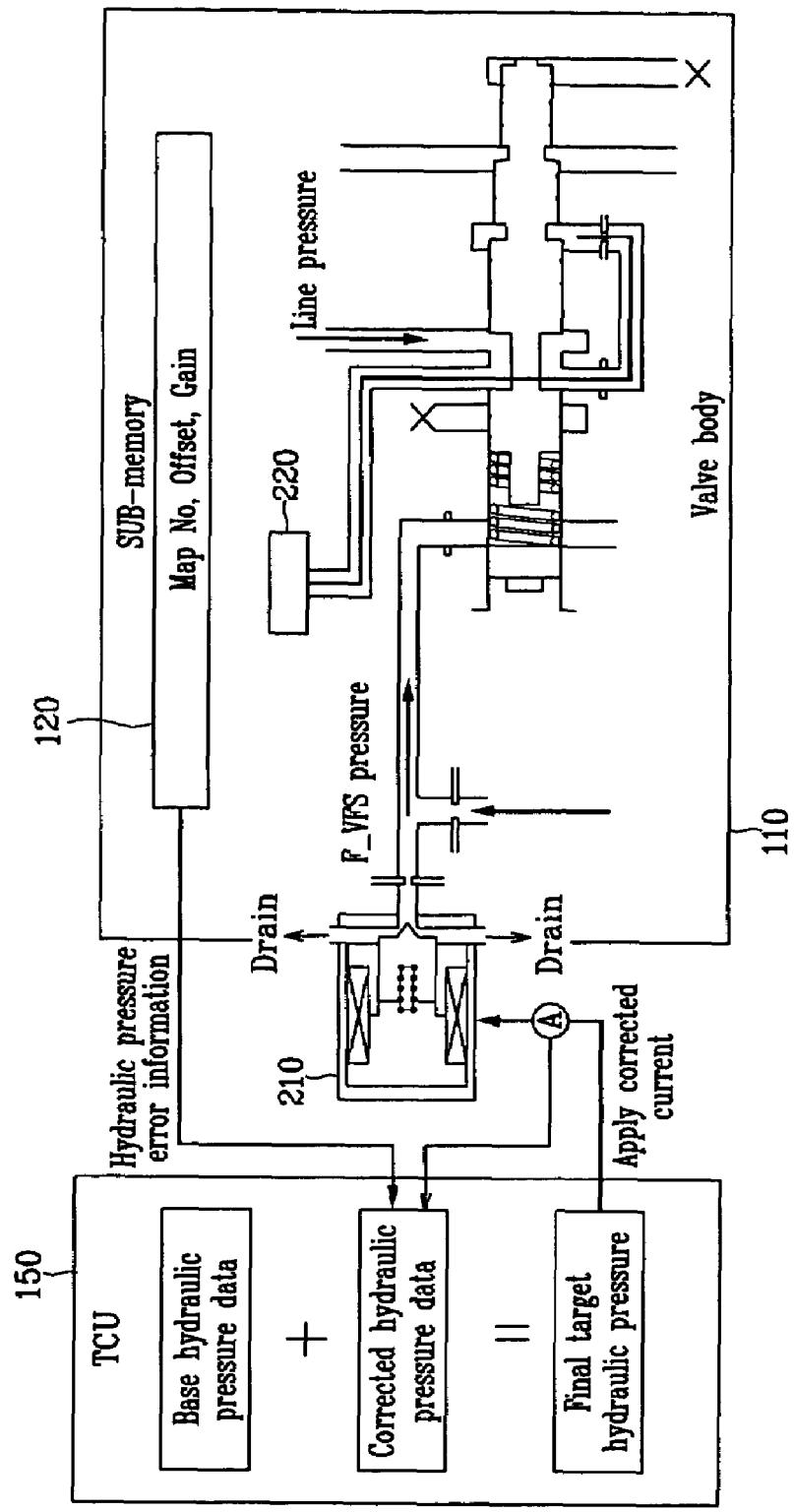
FIG. 2 is a schematic diagram illustrating interaction between a transmission control unit and a transmission main body in an automatic transmission system according to an embodiment of the present invention.

Operation of the TCU 150 may be summarized with reference to FIG. 2. During running of a vehicle, the TCU 150 controls a current of the solenoid valve 210 so as to resultantly control hydraulic pressure supplied to the friction element 220. During the controlling of the solenoid valve 210, the TCU 150 refers to information/data stored in the sub-memory 120.

Figure 3:
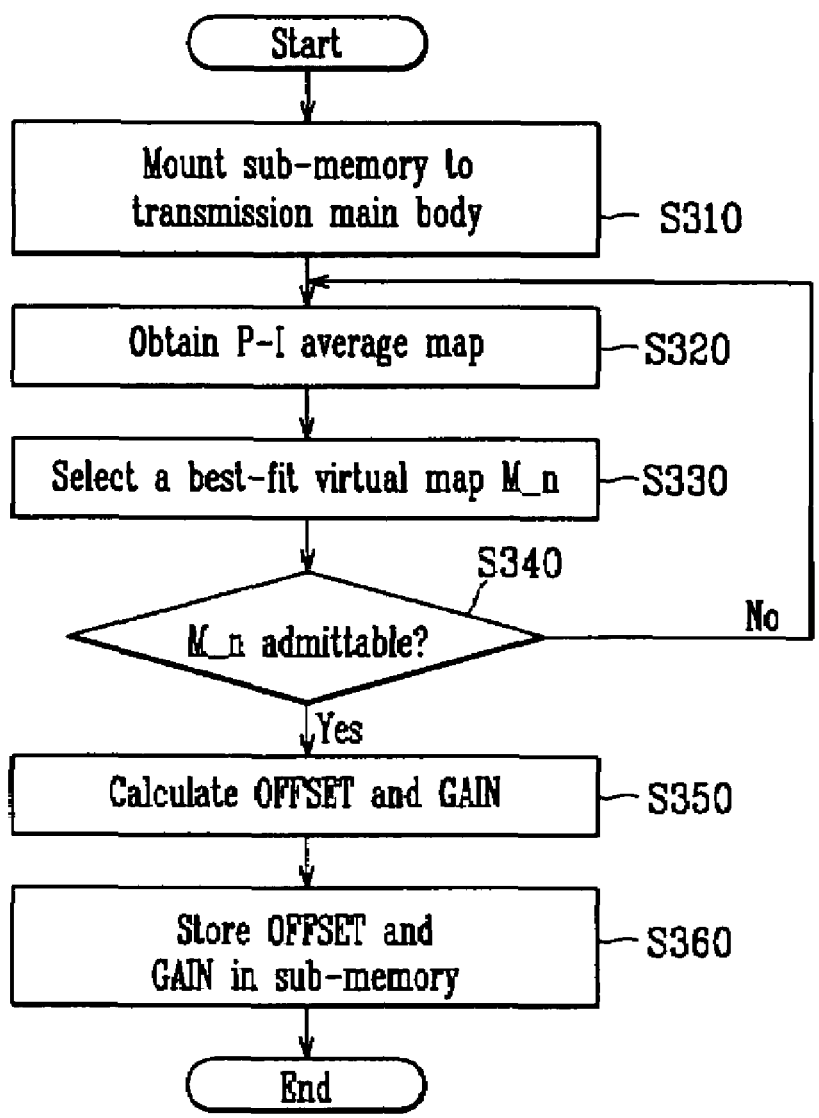
FIG. 3 is a flowchart showing a method for manufacturing an automatic transmission according to an embodiment of the present invention.

Firstly, a method for manufacturing an automatic transmission according to an embodiment of the present invention is hereinafter described in detail with reference to FIG. 3. According to a method for manufacturing an automatic transmission according to an embodiment of the present invention, firstly at step S310, the sub-memory 120 capable of storing a plurality of data is mounted to the transmission main body 100. This may be a physical or virtual mounting of sub-memory 120. However, the sub-memory should be positively associated with the transmission and fixedly mounting on the transmission main body is just one way of doing this. Virtual associations may be achieved, for example by pre-programming serial number cross-checks and other means as may be devised by persons skilled in the art based on the teachings herein.

When mechanical/hydraulic elements of the transmission main body are assembled together, a P-I average map P_ave representing a predetermined friction element 220 and a solenoid valve 210 corresponding thereto is obtained at step S320.

A P-I map refers to correlation of hydraulic pressure P supplied to the friction element 220 with respect to a current I applied to the solenoid valve 210. When the current I is applied to the solenoid valve 210, the hydraulic pressure P is supplied to the friction element 220. Therefore, the P-I map represents the correlation between the hydraulic pressure P and the current I.

For a same transmission main body 100, a plurality of calibrations are executed to obtain a plurality of P-I maps. The P-I average map (P_ave) represents an average correlation between the hydraulic pressure P and the current I that is obtained as an average of the P-I maps by the calibrations. Therefore, a characteristic in forming a hydraulic pressure P from solenoid current I is obtained with respect to friction elements and solenoid valves in a specific transmission main body, in the form of the P-I average map (P_ave).

Figure 4:
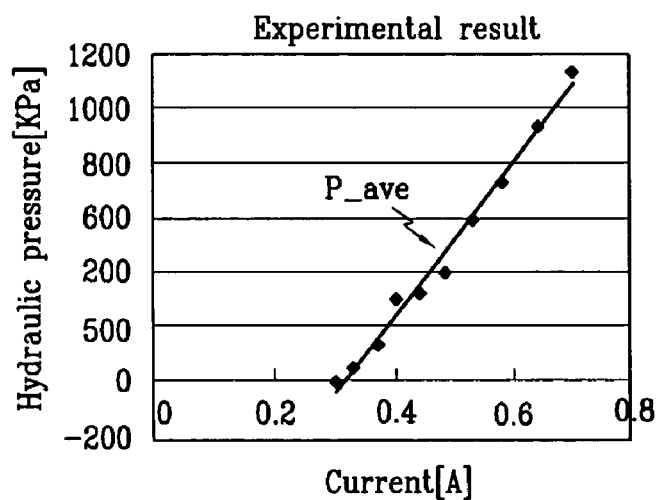
FIG. 4 is a graph illustrating an exemplary P-I average map P_ave used in an embodiment of the present invention.

Obtaining such a P-I average map (P_ave) for a specific transmission main body will be understood by a person of ordinary skill in the art based on the teachings herein. For better comprehension of a person of ordinary skill in the art, an exemplary P-I average map (P_ave) is illustrated in FIG. 4. According to the P-I average map (P_ave) shown in FIG. 4, hydraulic pressure begins to be supplied to the friction element 220 when a current higher than 0.3 A is applied to the solenoid valve 210, and hydraulic pressure supplied to the friction element 220 is illustrated as being proportional to the current applied to the solenoid valve 210.

For illustrational purpose and for better understanding, FIG. 4 illustrates the hydraulic pressure P to be proportional to the current I. However, it should not be understood that the scope of the present invention is limited thereto, since P-I average map (P_ave) may be obtained in any suitable shape. In addition, FIG. 4 illustrates only one measurement of hydraulic pressure for each current value. However, this is only for illustrational purposes, and it is notable that the best P-I average map may be obtained by averaging results of as many experiments as possible.

When the P-I average map (P_ave) is obtained at the step S320, a best-fit virtual map M_n that is best fitted to the P-I average map P_ave is selected at step S330, among a plurality of predetermined virtual maps M_i (I)(i=1, . . . , N). That is, at the step S330, the value n of index i is obtained.

The plurality of virtual maps M_i(I) (i=1, . . . , N) may be preset by a person of ordinary skill in the art, taking into account the characteristics of specific valve bodies 110 of the transmission main body 100. For better comprehension of a person of ordinary skill in the art, exemplary virtual maps M_i(I) (i=1, . . . , N) are shown in FIG. 5.

Figure 5:
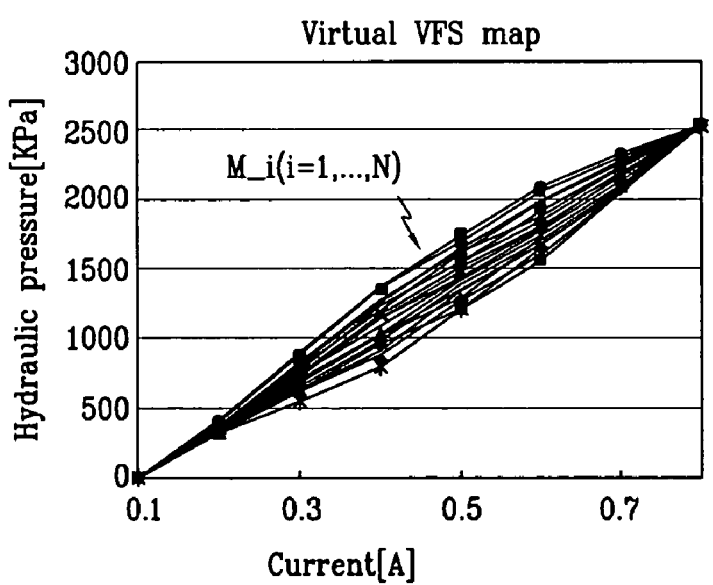
FIG. 5 is a graph illustrating exemplary virtual maps used in an embodiment of the present invention.

According to the exemplary virtual maps M_i(I) (i=1, . . . , N) shown in FIG. 5, the solenoid current I should be at least 0.1 A for a hydraulic pressure to be supplied to the friction element 220. In addition, a maximal hydraulic pressure is supplied to the friction element 220 when the solenoid current I is 0.8 A. For currents between the minimal current 0.1 A and the maximal current 0.8 A, hydraulic pressure supplied to the friction element 220 depends on the current in various patterns, and the patterns are preset in various virtual maps M_i(I) (i=1, . . . , N).

Figure 6:
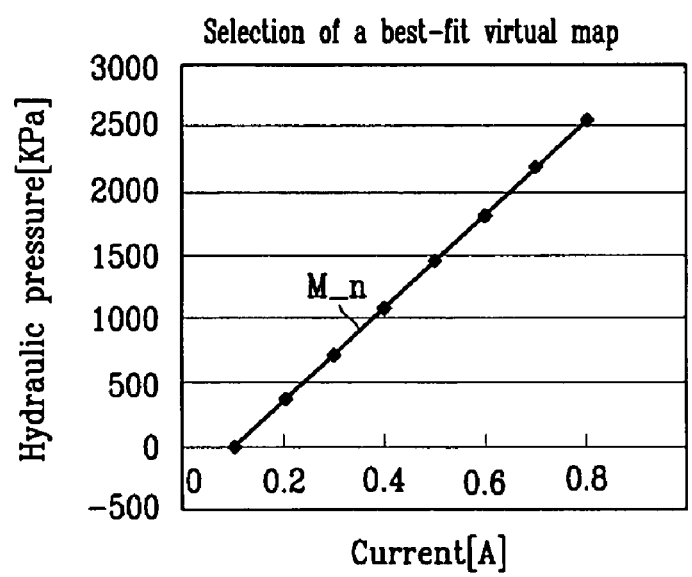
FIG. 6 is a graph illustrating an exemplary best-fit virtual map used in an embodiment of the present invention.

A standard to select the best-fit virtual map M_n from the virtual maps M_i(I) (i=1, . . . , N) may be selected by a person of ordinary skill in the art based on the teachings herein. For example, a virtual map that shows a smallest value for an absolute deviation calculated by a least squares method with respect to the P-I average map P_ave may be selected as the best-fit virtual map M_n. FIG. 6 shows an exemplary best-fit virtual map M_n selected as such.

When the best-fit virtual map M_n is selected, it is determined at step S340 whether a hydraulic pressure characteristic of the transmission main body 100 follows the selected best-fit virtual map M_n. At the step S340, a solenoid current corresponding to a target hydraulic pressure is calculated on the basis of the best-fit virtual map M_n. It is then determined whether the target hydraulic pressure is actually formed at the friction element by an application of the calculated solenoid current to the solenoid valve 210.

A standard to determine whether a hydraulic pressure characteristic of the transmission main body 100 follows the selected best-fit virtual map M_n may be selected by a person of ordinary skill in the art based on the teachings herein. For example, if an absolute deviation of the actual hydraulic pressure with respect to the target hydraulic pressure calculated by a least squares method is below a predetermined reference value, it may be determined that the hydraulic pressure characteristic of the transmission main body 100 follows the selected best-fit virtual map M_n.

In the case that the hydraulic pressure characteristic of the transmission main body 100 does not follow the selected best-fit virtual map M_n at the step S340, the step S320 of calculating the P-I average map P_ave is executed again.

In the case that the hydraulic pressure characteristic of the transmission main body 100 follows the selected best-fit virtual map M_n, values of parameters for a transformation between the best-fit virtual map M_n and the P-I average map P_ave are obtained at step S350.

According to one embodiment of the present invention, the parameters include an offset (OFFSET) for defining translation transformation of the P-I map and a gain (GAIN) for defining a scaling transformation of the P-I map. That is, at the step S350, values of offset and gain for defining the transformation between the best-fit virtual map M_n and the P-I average map P_ave are set as the parameter values.

Figure 7:
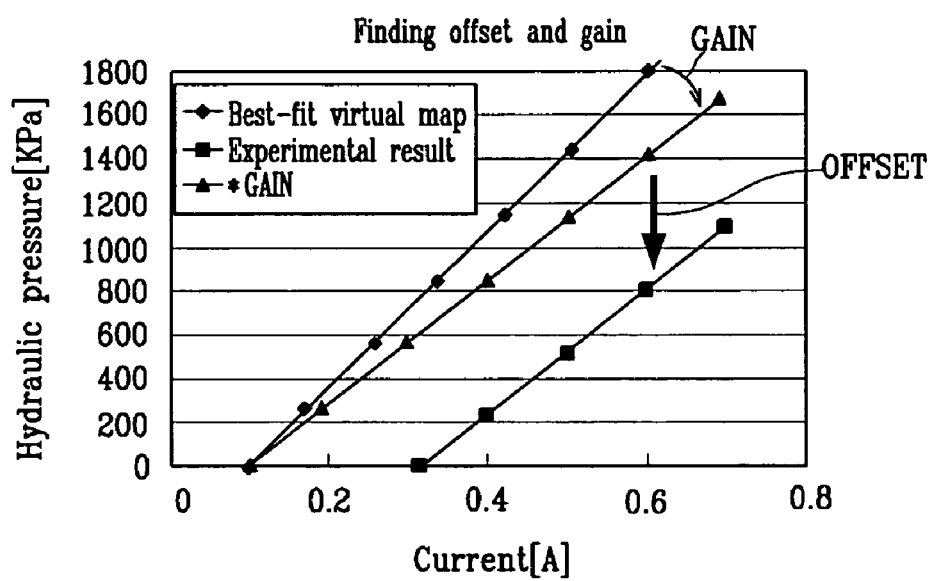
FIG. 7 is a graph for illustrating a process for obtaining offset and gain OFFSET and GAIN according to an embodiment of the present invention.

As shown in FIG. 7, an amount of scaling transformation that may change the slope of the best-fit virtual map M_n to be equal to the slope of the P-I average map P_ave is set as the value of gain (GAIN). In addition, the value of the offset (OFFSET) is found as a value of translation transformation that may move the scaling-transformed best-fit virtual map M_n such that an x-intercept of the moved best-fit virtual map M_n coincides on the intercept of an x-intercept of the P-I average map P_ave. Therefore, by such offset and gain values, an actual hydraulic pressure P_actual actually supplied to the friction element 220 by an application of a current I to the solenoid valve 210 may be obtained by a formula "P_actual=M_n(I)×GAIN−OFFSET."

When the offset and gain values are obtained, the identification information n of the best-fit virtual map M_n and the offset and gain values OFFSET and GAIN are stored in the sub-memory 120 at step S360. The storing of the identification information n of the best-fit virtual map and the offset and gain values may be understood as meaning identifying the transmission main body 100 with a particular hydraulic pressure characteristic thereof. Therefore, a TCU produced without any one-to-one correspondence with a specific transmission main body 100 may retrieve the values of the identification information n of the best-fit virtual map, the offset, and the gain, and then control the transmission main body 100 appropriately based thereon.

Figure 8:
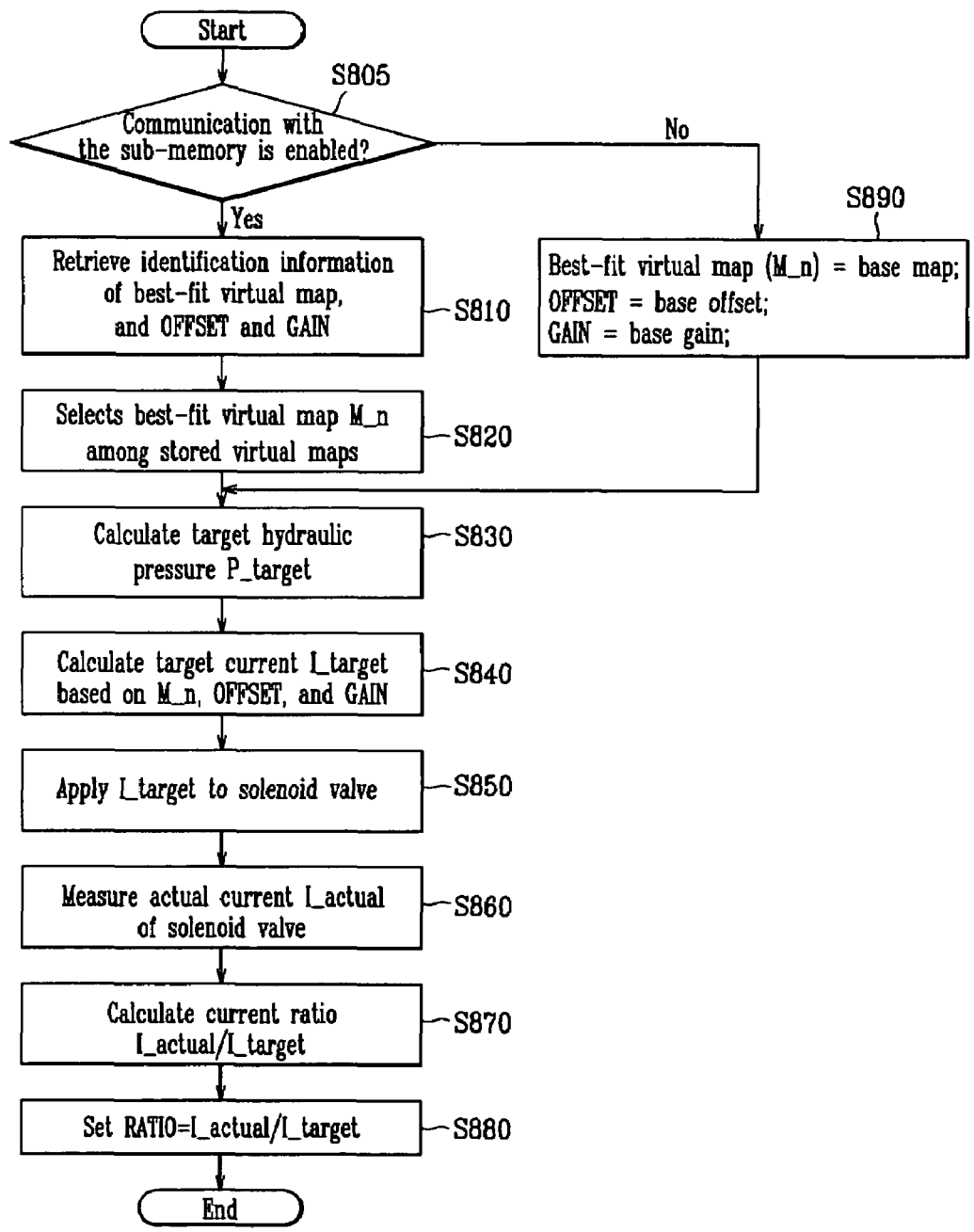
FIG. 8 is a flowchart showing a method for controlling an automatic transmission according to an embodiment of the present invention.

Hereinafter, a method for controlling an automatic transmission according to an embodiment of the present invention in which the TCU 150 retrieves the values stored in the sub-memory 120 and controls the transmission main body 100 based thereon is described in detail with reference to FIG. 8.

When a vehicle having an automatic transmission is produced, such a transmission main body 100 and the TCU 150 are installed in the vehicle. Accordingly the TCU 150 becomes communicable with the sub-memory 120 of the transmission main body 100. In addition, the TCU 150 stores the plurality of virtual maps M_i (i=1, . . . , N) therein.

Firstly at step S805, the TCU determines whether a communication with the sub-memory is enabled. The enablement of the communication may be determined on the basis of, e.g., whether a signal is detected from the sub-memory 120. The case that the communication between the TCU 150 and the sub-memory 120 is not enabled is described later in detail.

When the communication between the TCU 150 and the sub-memory 120 is enabled, the TCU 150 retrieves, at step S810, the identification information n of the best-fit virtual map and also the parameter values (i.e., offset and gain values OFFSET and GAIN) stored in the sub-memory 120.

Subsequently at step S820, the TCU 150 selects the best-fit virtual map M_n among the virtual maps M_i (i=1, . . . , N), correspondingly to the identification information n.

While a vehicle is running, the TCU 150 controls hydraulic pressure P supplied to the friction element 220, on the basis of a running state (such as a vehicle speed and throttle opening) of the vehicle.

In this case, the TCU calculates, at step S830, a target hydraulic pressure P_target that should be applied to the friction element 220.

Subsequently at step S840, the TCU 150 calculates a target current I_target that will be applied to the solenoid valve 210 such that the target hydraulic pressure will be supplied to the friction element 220.

At the step S840, the TCU 150 calculates the target current I_target on the basis of the selected best-fit virtual map M_n and the retrieved parameter values OFFSET and GAIN. In more detail, at the step S840, the TCU 150 calculates the target current I_target as a value of current I that satisfies the following equation 1.

$$P\_target = M\_n(I \times RATIO) \times GAIN - OFFSET \quad \text{(equation 1)}$$

At the step S840, the parameter value RATIO is a correction rate that is initially preset as 1 and may be altered by correction steps that are described later in detail.

When the target current I_target is calculated as such, the TCU 150 applies the target current I_target to the solenoid valve 210 at step S850. In this case, the TCU 150 applies the target current I_target to the solenoid valve 210 in a pulse width modulation (PWM) scheme. Other schemes may be used.

When the TCU 150 has applied the target current I_target to the solenoid valve 210, the TCU 150 measures, at step S860, an actual current I_actual that is actually applied to the solenoid valve 210. That is, the TCU 150 measures the actual current I_actual that actually flows through the solenoid valve 210 by the PWM signal applied to the solenoid valve 210.

Then at step S870, the TCU 150 compares the target current I_target with the actual current I_actual, and calculates their current ratio. At the step S870, the current ratio is calculated as I_actual/I_target, a ratio of the actual current I_actual with respect to the target current I_target.

Subsequently, at step S880, the TCU 150 sets the value of the current correction rate RATIO to be the ratio I_actual/I_target.

The TCU 150 monitors whether the solenoid valve 210 operates in accordance with the target current I_target applied by the TCU 150, and feeds back the monitored results to the calculation of the target current I_target. Therefore, the actual current I_actual of the solenoid valve 210 is always controlled to stay at a value that corresponds to the target hydraulic pressure P_target of the friction element 220.

Referring back to the step S805, when the communication between the TCU 150 and the sub-memory 120 is not enabled, the TCU 150 sets parameter values to be predetermined ones at step S890, and proceeds to the step S830. At the step S890, the TCU 150 sets a predetermined base map as the best-fit virtual map and predetermined base offset and base gain as the offset and gain values OFFSET and GAIN.

Therefore, when the communication between the TCU 150 and the sub-memory 120 is not enabled, the target current I_target is then calculated at the step S830 on the basis of the predetermined base offset, the predetermined base gain, and the predetermined base map, instead of offset and gain values retrieved from the sub-memory 120 and a best-fit virtual map selected from the virtual maps.

According to an embodiment of the present invention, an automatic transmission may be precisely controlled regardless of allowable/unallowable tolerance in hydraulic pressure characteristics occurring at a solenoid valve of the automatic transmission.

Parameter values for defining hydraulic pressure characteristics of a solenoid valve of a specific transmission main body are stored in a memory positively associated with the transmission, preferably fixedly mounted to the transmission main body. Therefore, a transmission control unit may stably control the transmission main body, even if the transmission control unit is produced in a separate process and place from the transmission main body.

In addition, according to an embodiment of the present invention, an actual current flowing through a solenoid valve is monitored, and therefore, control of a friction element becomes actually more precise and more stable.

Furthermore, according to an embodiment of the present invention, at least the control precision as of the prior art is ensured even if the communication between the transmission control unit and the memory is not enabled.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for manufacturing an automatic transmission, comprising:
    associating a sub-memory with a transmission main body, the sub-memory being capable of storing a plurality of data;
    obtaining a P-I average map corresponding to a predetermined friction element and a solenoid valve for the predetermined friction element;
    selecting a best-fit virtual map among a plurality of virtual maps, the best-fit virtual map being a virtual map best fitted to the P-I average map;
    setting parameter values for transformation between the best-fit virtual map and the P-I average map; and
    storing identification information of the best-fit virtual map and the parameter values in the sub-memory.

2. The method of claim 1, wherein said associating comprises the sub-memory being fixedly mounted to a part of the transmission main body.

3. The method of claim 2, wherein the sub-memory is fixedly mounted to a valve body of the automatic transmission.

4. The method of claim 1, wherein the parameters values comprise an offset for defining a translation transformation of the P-I map and a gain for defining a scaling transformation of the P-I map.

5. A method for controlling an automatic transmission, comprising:
    retrieving parameter values and identification information of a best-fit virtual map stored in a sub-memory associated with a transmission main body;
    selecting the best-fit virtual map from a plurality of predetermined virtual maps corresponding to the identification information;
    calculating a target hydraulic pressure for a target friction element of the automatic transmission;
    calculating a target current of a target solenoid valve for the target hydraulic pressure, on the basis of the virtual map and the parameter values; and
    applying the target current to the target solenoid valve.

6. The method of claim 5, wherein the parameter values comprise an offset defining a translation transformation of the P-I map and a gain defining a scaling transformation of the P-I map.

7. The method of claim 6, wherein the calculating of the target current calculates the target current as a value of I_target that satisfies "P_target= M_n(I_target×RATIO)× GAIN−OFFSET",
    wherein M_n denotes the best-fit virtual map, RATIO denotes a current correction rate, and P_target denotes the target hydraulic pressure.

8. The method of claim 5, further comprising:
    measuring an actual current that is actually applied to the target solenoid valve by the applying of the target current to the target solenoid valve; and
    calculating a current correction value on the basis of the target current and the actual current,
    wherein the calculating of the target current calculates the target current further based on the current correction value.

9. The method of claim 5, further comprising:
    determining whether communication with the sub-memory is enabled; and
    setting a predetermined base map as the best-fit virtual map and predetermined base values as the parameter values,
    wherein the calculating of the target current calculates the target current on the basis of the predetermined base map and the predetermined base values in the case that the communication with the sub-memory is not enabled.

10. The method of claim 5, wherein the parameter values and the identification information of the best-fit virtual map is stored through a method comprising:
    mounting a sub-memory to a transmission main body, the sub-memory being capable of storing a plurality of data;
    obtaining a P-I average map corresponding to a predetermined friction element and a solenoid valve for the predetermined friction element;
    selecting a best-fit virtual map among a plurality of virtual maps, the best-fit virtual map being best fitted to the P-I average map;
    setting parameter values for transformation between the best-fit virtual map and the P-I average map; and
    storing identification information of the best-fit virtual map and the parameter values in the sub-memory.

11. An automatic transmission system comprising:
    a transmission main body including at least one friction element, and a solenoid valve for controlling hydraulic pressure supplied to the friction element;
    a sub-memory associated with the transmission main body storing parameter values and identification information of best-fit virtual map; and
    a transmission control unit storing a plurality of predetermined virtual maps and controlling the transmission main body based thereon,
    wherein the transmission control unit executes instructions for retrieving parameter values and identification information of a best-fit virtual map stored in a sub-memory mounted to a transmission main body,
    selecting the best-fit virtual map from a plurality of predetermined virtual maps corresponding to the identification information,
    calculating a target hydraulic pressure for a target friction element of the automatic transmission,
    calculating a target current of a target solenoid valve for the target hydraulic pressure on the basis of the virtual map and the parameter values, and
    applying the target current to the target solenoid valve.

12. The automatic transmission system of claim 11, wherein the sub-memory is fixedly mounted to the transmission main body.

13. The automatic transmission system of claim 11, wherein the parameters values comprise an offset defining a translation transformation of the P-I map and a gain defining a scaling transformation of the P-I map.

14. The automatic transmission system of claim 13, wherein the calculating of the target current calculates the target current as a value of I_target that satisfies "P_target= (I_target×RATIO)×GAIN−OFFSET",
    wherein M_n denotes the best-fit virtual map, RATIO denotes a current correction rate, and P_target denotes the target hydraulic pressure.

15. The automatic transmission system of claim 11, wherein the transmission control unit further executes instructions for:
    measuring an actual current that is actually applied to the target solenoid valve after the applying of the target current to the target solenoid valve; and calculating a current correction value on the basis of the target current and the actual current,
wherein the calculating of the target current calculates the target current further based on the current correction value.

16. The automatic transmission system of claim 11, wherein the transmission control unit further executes instructions for:
determining whether communication with the sub-memory is enabled; and
setting a predetermined base map as the best-fit virtual map and predetermined base values as the parameter values,
wherein the calculating of the target current calculates the target current on the basis of the predetermined base map and the predetermined base values in the case that the communication with the sub-memory is not enabled.

17. The automatic transmission system of claim 11, wherein the parameter values and the identification information of the best-fit virtual map is stored through a method comprising:
mounting a sub-memory to a transmission main body, the sub-memory being capable of storing a plurality of data;
obtaining a P-I average map corresponding to a predetermined friction element and a solenoid valve for the predetermined friction element;
selecting a best-fit virtual map among a plurality of virtual maps, the best-fit virtual map being best fitted to the P-I average map;
setting parameter values for transformation between the best-fit virtual map and the P-I average map; and
storing identification information of the best-fit virtual map and the parameter values in the sub-memory.

* * * * *